(12) United States Patent
Watnik

(10) Patent No.: US 11,175,495 B2
(45) Date of Patent: Nov. 16, 2021

(54) VORTEX OPTICAL ISOLATOR

(71) Applicant: The Government of the United States of America, as represented by the Secretary of the Navy, Arlington, VA (US)

(72) Inventor: Abbie T. Watnik, Washington, DC (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 421 days.

(21) Appl. No.: 16/438,555

(22) Filed: Jun. 12, 2019

(65) Prior Publication Data
US 2020/0393672 A1  Dec. 17, 2020

(51) Int. Cl.
*G02B 27/28* (2006.01)
*G02B 27/00* (2006.01)
*G02B 5/00* (2006.01)

(52) U.S. Cl.
CPC .......... *G02B 27/0018* (2013.01); *G02B 5/005* (2013.01); *G02B 27/286* (2013.01)

(58) Field of Classification Search
CPC .. G02B 27/0018; G02B 27/286; G02B 5/005; H04J 14/0202; H04B 10/2504
See application file for complete search history.

(56) References Cited

FOREIGN PATENT DOCUMENTS

CN     108980263 A    *  12/2018

OTHER PUBLICATIONS

Jalas et al., What is—and what is not —an optical isolator, Nature Photonics, Aug. 2013, pp. 579-582, vol. 7, Macmillan Publishers Limited, London, UK.
Mawet et al., Taking the vector vortex coronagraph to the next level for ground- and space-based exoplanet imaging instruments: review of technology developments in the USA, Japan, and Europe, Techniques and Instrumentation for Detection of Exoplanets V, edited by Stuart Sheldon, Proceedings of SPIE, 2011, pp. 815108-1-815108-14, vol. 8151, SPIE, Bellingham, WA, USA.

* cited by examiner

*Primary Examiner* — Darryl J Collins
*Assistant Examiner* — Tamara Y. Washington
(74) *Attorney, Agent, or Firm* — US Naval Research Laboratory; Suresh Koshy

(57) ABSTRACT

An optical apparatus and method of using same. The optical apparatus includes a vortex optical isolator including an axis. The vortex optical isolator includes a first amplitude mask defining a first limiting aperture and aligned with the axis. The first limiting aperture includes a first radius. The vortex optical isolator includes a first lens aligned with the axis. The vortex optical isolator includes a vortex phase mask aligned with the axis. The vortex optical isolator includes a second lens aligned with the axis. The vortex optical isolator includes a second amplitude mask defining a second limiting aperture aligned with the axis. The second limiting aperture includes a second radius sufficiently smaller than the first radius so as to block reverse light traveling through the optical apparatus. The apparatus includes a standard light source configured to transmit forward light through the vortex optical isolator.

15 Claims, 3 Drawing Sheets

VORTEX OPTICAL ISOLATOR

BACKGROUND OF THE INVENTION

Field of the Invention

This invention relates in general to a device for protecting a light source in an imaging system and, more particularly to a device for protecting the light source by preventing back reflections into the imaging system by only allowing transmission in one direction.

Description of the Related Art

An optical isolator blocks light in one direction, but does allow light to pass in the opposite direction, thereby acting as an optical diode. Several types of conventional optical isolators exist including: conventional magneto-optical material-based isolators (e.g., Faraday optical isolators), conventional nonlinear material-based isolators (e.g., Raman amplification, stimulated Brillouin scattering and chirped nonlinear optical photonic crystals), and conventional time-dependent refractive index optical isolators.

The limitation on such conventional optical isolators is the suppression level, i.e., how much light enters the system through the back-propagation direction. Current commercial Faraday optical isolators have suppression levels of ~30-40 dB.

BRIEF SUMMARY OF THE INVENTION

An embodiment of the invention includes an optical apparatus. The optical apparatus includes a vortex optical isolator, which in turn includes a longitudinal axis. The vortex optical isolator includes a first amplitude mask defining a first limiting aperture and aligned with the axis. The first limiting aperture includes a first radius. The vortex optical isolator includes a first lens in optical communication with the first limiting aperture and aligned with the axis. The vortex optical isolator includes a vortex phase mask in optical communication with the first lens and aligned with the axis. The vortex optical isolator includes a second lens in optical communication with the vortex phase mask and aligned with the axis. The vortex optical isolator includes a second amplitude mask defining a second limiting aperture in optical communication with the second lens and aligned with the axis. The second limiting aperture includes a second radius sufficiently smaller than the first radius so as to block reverse light traveling through the optical apparatus. The apparatus includes a standard light source configured to transmit forward light through the vortex optical isolator. The light source is oriented on the axis such that the second amplitude mask blocks reverse light transmitted in a direction opposite to that of the forward light from impinging the light source. Optionally, the light source includes a standard laser, a standard light emitting diode, or a standard light bulb.

Another embodiment of the invention includes a method for blocking reverse light transmitted through an optical apparatus. A vortex optical isolator in optical communication with a light source is provided. A forward light is transmitted from the light source through the vortex optical isolator. Reverse light in a direction opposite to that of the forward light is received at and transmitted through at least a portion of the vortex optical isolator. Using the vortex optical isolator, the reverse light is blocked from impinging the light source.

Embodiments of the invention are used in applications including, but not limited to, high power applications, prevention of back reflections into a laser source, and prevention of jamming for an optical communications system.

An embodiment of this invention exhibits higher laser suppression levels of reverse light than conventional optical isolators. Consequently, this embodiment of the invention evidences better optical isolation than previously possible. An embodiment of the instant invention is expected to exhibit 9 orders of magnitude, contrast—equivalent to 60 dB isolation.

DETAILED DESCRIPTION OF THE INVENTION

Figure 1:
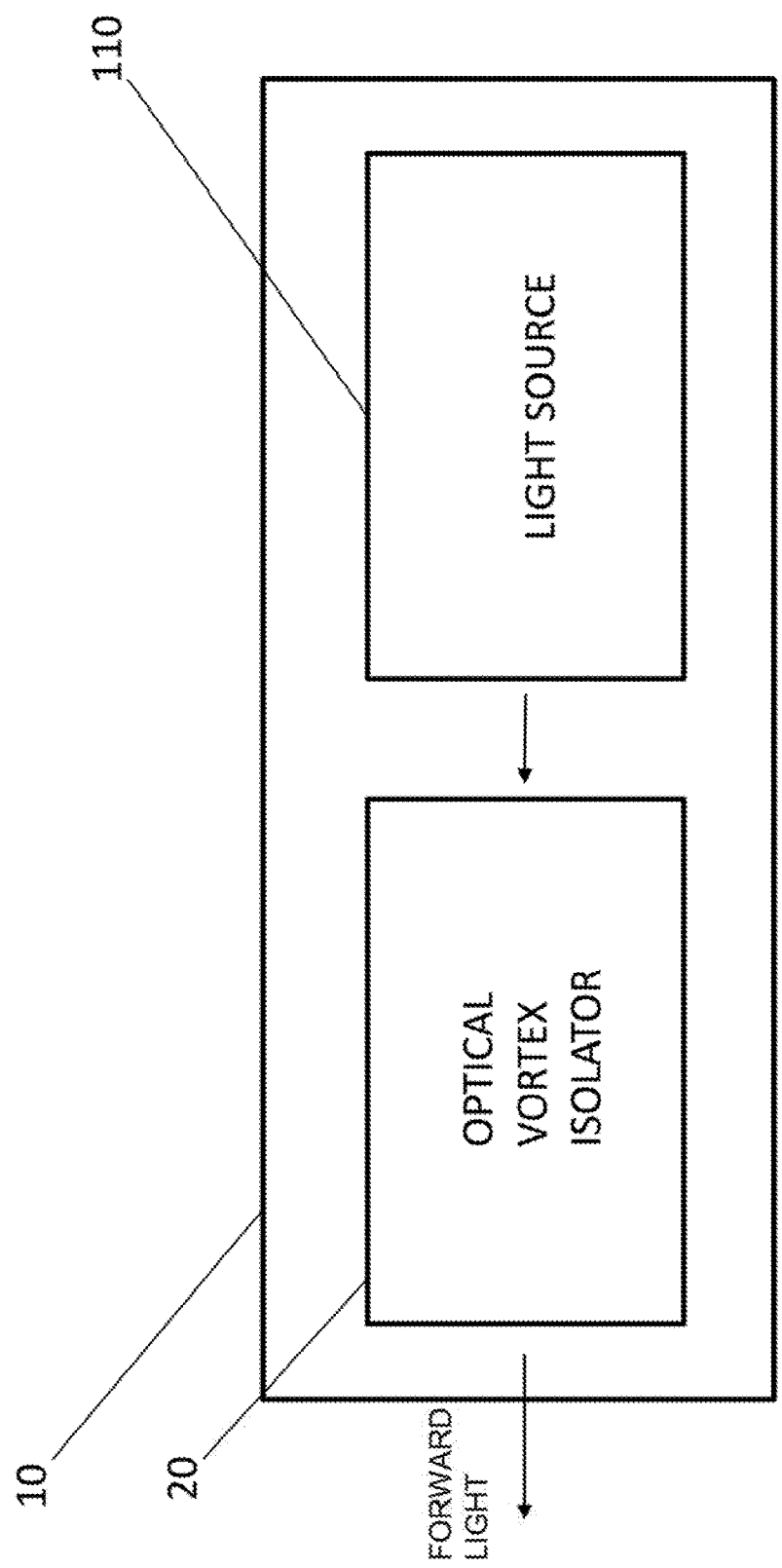
FIG. 1 is a block diagram of an embodiment of the instant invention.
Figure 2:
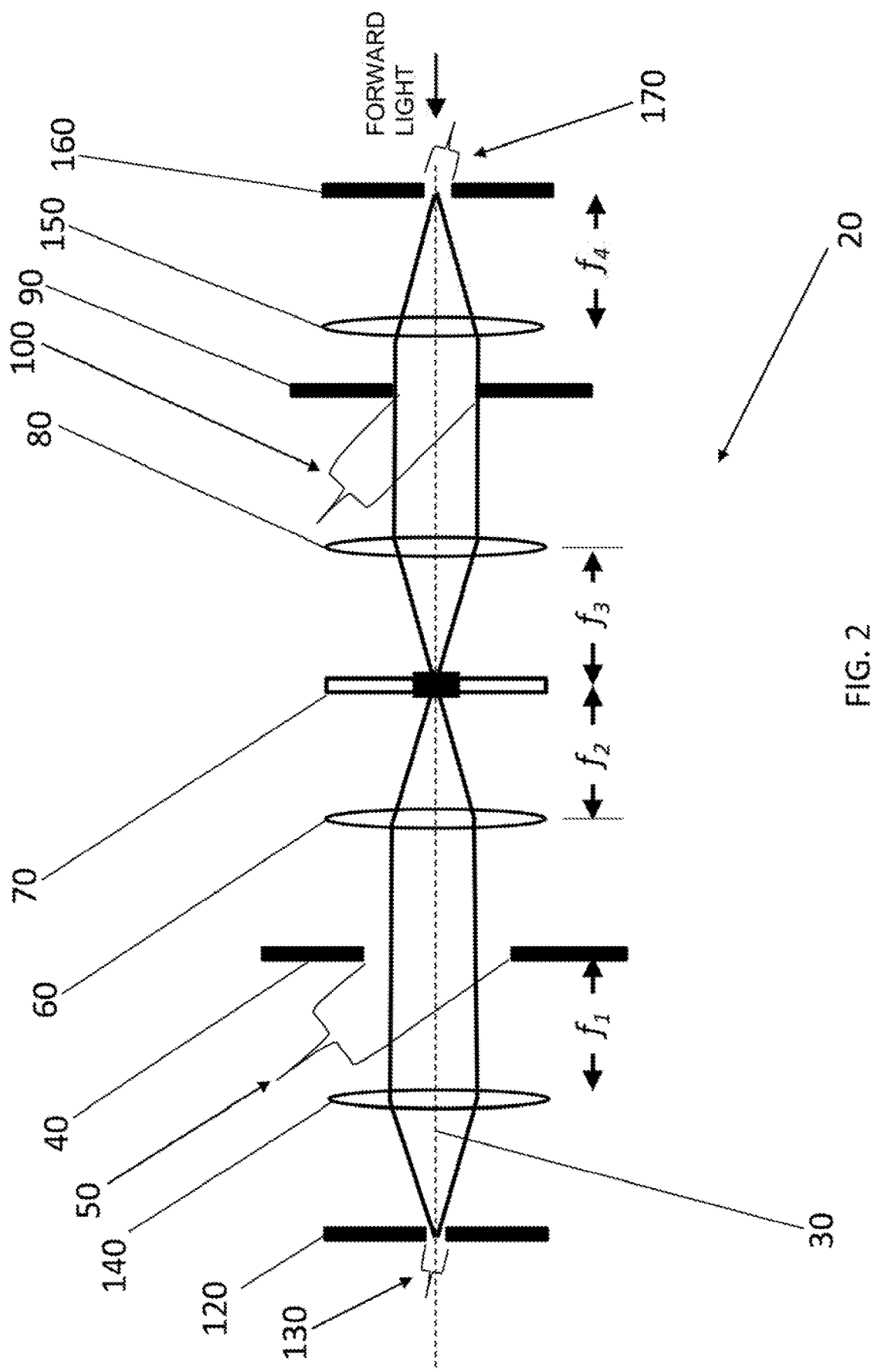
FIG. 2 is a schematic diagram of an embodiment of the instant invention, showing its operation in the presence of forward light.
Figure 3:
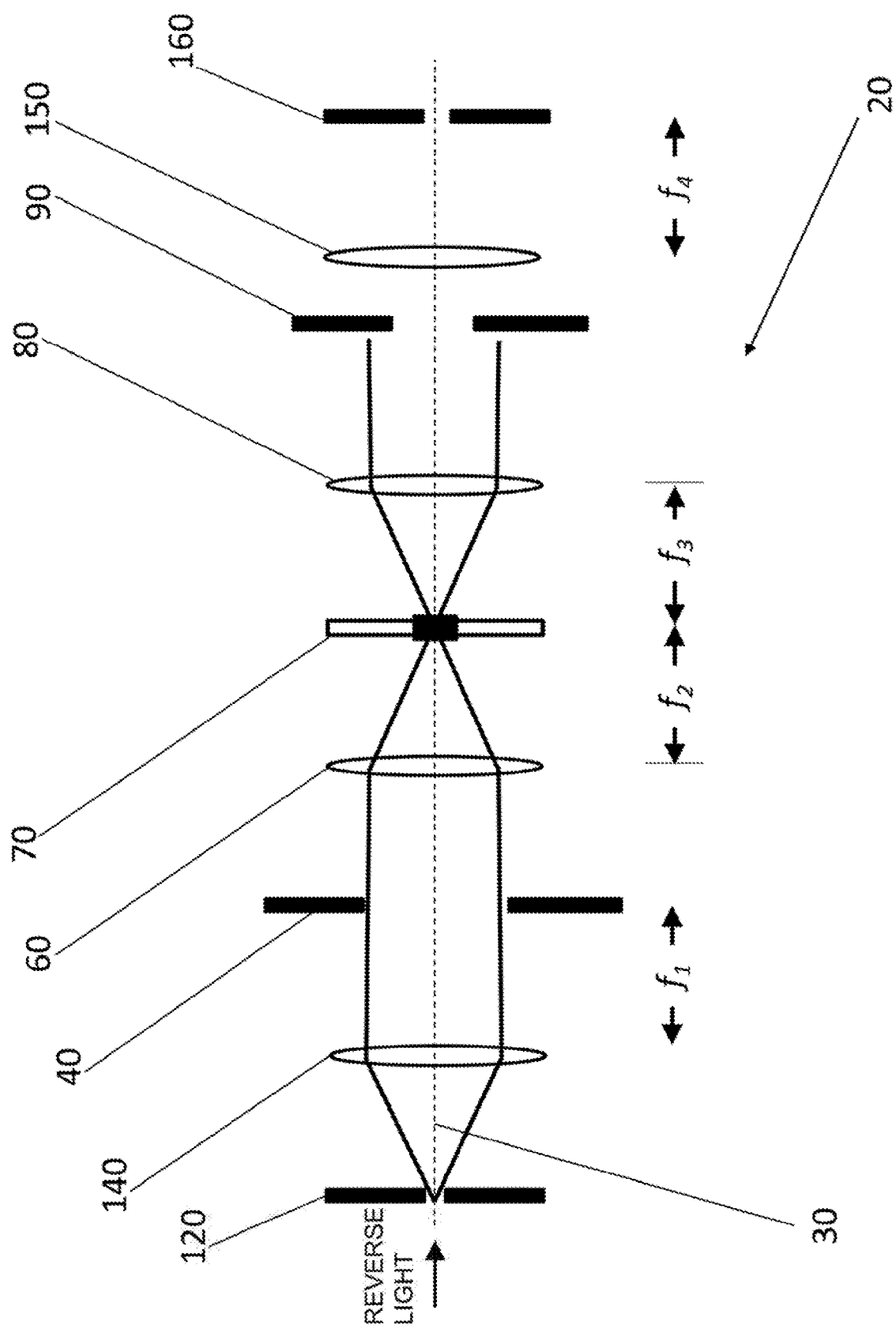
FIG. 3 is a schematic diagram of an embodiment of the instant invention, showing its operation in the presence of reverse light.

An embodiment of the invention includes an optical apparatus 10 and is described as follows with reference to FIGS. 1-3. The optical apparatus 10, for example, includes an imaging system. The optical apparatus 10 includes a vortex optical isolator 20, which in turn includes a longitudinal axis 30. The vortex optical isolator 20 includes a first amplitude mask 40 defining a first limiting aperture 50 and aligned with the axis 30. The first amplitude mask 40 is a standard amplitude mask. The first limiting aperture 50 includes a first radius $R_1$. The vortex optical isolator 20 includes a first lens 60 in optical communication with the first limiting aperture 50 and aligned with the axis 30. The first lens 60 is a standard lens. For the purpose of this patent application, element A "in optical communication" element B means light is able to transmit directly or indirectly from element A to element B. The vortex optical isolator 20 includes a vortex phase mask 70 in optical communication with the first lens 60 and aligned with the axis 30. The vortex phase mask 70 is a standard vortex phase mask. For example, the vortex phase mask 70 includes a standard scalar (i.e., phase-based) vortex phase mask. Such a vortex phase mask is based on the longitudinal phase delay of the incoming light. As another example, the vortex phase mask 70 includes a standard vector (i.e., polarization-based) vortex phase mask, wherein the vector vortex is obtained by manipulating the transverse polarization state of the light. In practice, the vortex phase mask 70 is selected for particular wavelengths of interest as appropriate for a user's application. In an embodiment of the invention, the vortex phase mask 70 includes a standard circularly symmetric vortex phase mask, allowing for circular aperture stops denoted as amplitude masks 40 and 90. In another embodiment of the invention, the vortex phase mask 70 includes a standard asymmetric vortex plate (e.g., elliptical) created with a change in the phase profile; similarly, the aperture stops denoted as amplitude, masks 40 and 90 are adjusted to form an elliptical opening to account for the change of shape of the "ring of fire," discussed below. The vortex optical isolator 20 includes a second lens 80 in optical communication with the vortex phase mask 70 and aligned with the axis 30. The second lens 80 is a standard lens. The vortex optical isolator 20 includes a second amplitude mask 90 defining a second limiting aperture 100 in optical communication with the second lens 80 and aligned with the axis 30. The second amplitude mask 90 is a standard amplitude mask. The second limiting aperture 100 includes a second radius $R_2$ sufficiently smaller than the first radius $R_1$ so as to block reverse light traveling through the optical apparatus 10. The optical apparatus 10 includes a standard light source 110 configured to transmit forward light through the vortex optical isolator 20. The light source 110 is oriented on the axis 30 such that the second amplitude mask 90 blocks reverse light, transmitted in a direction opposite to that of the forward light, from impinging the light source 110. Optionally, the light source includes a standard laser, a standard light emitting diode, or a standard light bulb.

Optionally, the vortex optical isolator 20 further includes a third amplitude mask 120. The third amplitude mask is a standard amplitude mask. The third amplitude mask 120 is aligned with the axis 30 and includes a first pinhole aperture 130. The vortex optical isolator 20 further includes a third lens 140 in optical communication with the first pinhole aperture 130 and aligned with the axis 30. The third lens 140 is a standard lens. Optionally, the vortex optical isolator 20 further includes a fourth lens 150 in optical communication with the second limiting aperture 100 and aligned with the axis 30. The fourth lens is a standard lens. The vortex optical isolator 20 further includes a fourth amplitude mask 160 in optical communication with the fourth lens 150 and the light source 110. The fourth amplitude mask 160 is a standard amplitude mask. The fourth amplitude mask 160 includes a second pinhole aperture 170 in optical communication with the light source and aligned with the axis.

Optionally, the fourth lens 150 collimates the forward light passing through the second pinhole aperture 170 from the light source 110. The second lens 80 focuses the forward light passing through the second limiting aperture 100 to the vortex phase mask 70. The first lens 60 collimates the forward light passing from the vortex phase mask 70. The third lens 140 focuses the forward light passing through the first limiting aperture 50 to the first pinhole aperture 130.

Optionally, the third lens 140 collimates the reverse light passing through the first pinhole aperture 130, said first lens focusing the reverse light onto said vortex phase mask, said second lens collimating the reverse light.

Optionally, the third lens 140 is located at a focal length from the first amplitude mask 40. The first lens 60 is located at the focal length from the vortex phase mask 70. The vortex phase mask 70 is located at the focal length from the second lens 80. The fourth lens 150 is located at the focal length from the fourth amplitude mask 160.

Another embodiment of the invention includes a method for blocking reverse light transmitted through an optical apparatus 10. A vortex optical isolator 20 in optical communication with a light source 110 is provided in the optical apparatus 10. A forward light is transmitted from the light source 110 through the vortex optical isolator 20. Reverse light in a direction opposite to that of the forward light is received at and transmitted through at least a portion of the vortex optical isolator 20. Using the vortex optical isolator 20, the reverse light is blocked from impinging the light source 110.

Optionally, the vortex optical isolator 20 includes a longitudinal axis 30. The vortex optical isolator 20 includes a first amplitude mask 40 defining a first limiting aperture 50 and aligned with the axis 30. The first amplitude mask 40 is a standard amplitude mask. The first limiting aperture 50 includes a first radius. The vortex optical isolator 20 includes a first lens 60 in optical communication with the first limiting aperture 50 and aligned with the axis 30. The first lens 60 is a standard lens. The vortex optical isolator 20 includes a vortex phase mask 70 in optical communication with the first lens 60 and aligned with the axis 30. The vortex phase mask 70 is a standard vortex phase mask. The vortex optical isolator 20 includes a second lens 80 in optical communication with the vortex phase mask 70 and aligned with the axis 30. The second lens 80 is a standard lens. The vortex optical isolator 20 includes a second amplitude mask 90 defining a second limiting aperture 100 in optical communication with the second lens 80 and aligned with the axis 30. The second amplitude mask 90 is a standard amplitude mask. The second limiting aperture 100 includes a second radius sufficiently smaller than the first radius so as to block reverse light traveling through the optical apparatus 10. The apparatus 10 includes a standard light source 110 configured to transmit forward light through the vortex optical isolator 20. The light source 110 is oriented on the axis 30 such that the second amplitude mask 90 blocks reverse light, transmitted in a direction opposite to that of the forward light, from impinging the light source 110. Optionally, the light source 110 includes a standard laser, a standard light emitting diode, and/or a standard light bulb. Optionally, the vortex optical isolator 20 further includes a third amplitude mask 120 aligned with the axis 30 and including a first pinhole aperture 130. The vortex optical isolator 20 further includes a third lens 140 in optical communication with the first pinhole aperture 130 and aligned with the axis 30. Optionally, the vortex optical isolator 20 further includes a fourth lens 150 in optical communication with the second limiting aperture 100 and aligned with the axis 30. The vortex optical isolator 20 further includes a fourth amplitude mask 160 in optical communication with the fourth lens 150 and the light source 110. The fourth amplitude mask 160 includes a second pinhole aperture 170 in optical communication with the light source and aligned with the axis 30.

Optionally, the blocking, using the vortex optical isolator, the reverse light from impinging the light source step includes the following. The reverse light is collimated using the third lens 140. The reverse light is focused onto the vortex phase mask 70 using the first lens 60. The reverse light is collimated using the second lens 80. The reverse light is blocked using the second amplitude mask 90.

Optionally, the transmitting a forward light from the light source through the vortex optical isolator step includes the following. The forward light is focused onto the vortex phase mask 70 using the second lens 80. The forward light is collimated using the first lens 60. The forward light is focused onto the first pinhole aperture using the third lens 140.

Optionally, the vortex optical isolator 20 further includes a fourth lens 150 in optical communication with the second limiting aperture 100 and aligned with the axis 30. The vortex optical isolator 20 further includes a fourth amplitude mask 160 in optical communication with the fourth lens 150 and the light source 110. The fourth amplitude mask 160 includes a second pinhole aperture 170 in optical communication with the light source and aligned with the axis. Optionally, the transmitting a forward light from the light source through the vortex optical isolator step includes the following. The forward light is collimated using the fourth lens 150.

Optionally, the third lens 140 is located at a focal length from the first amplitude mask 40. The second lens 80 is located at the focal length from the vortex phase mask 70. The vortex phase mask 70 is located at the focal length from the second lens 80. The fourth lens 150 is located at the focal length from the fourth amplitude mask 160. Optionally, the light source 110 includes a standard laser, a standard light emitting diode, or a standard light bulb.

Another embodiment of the invention is described as follows with reference to FIGS. 1-3. The optical arrangement in the forward light-propagating direction (i.e., right to left) is shown by way of illustration in FIG. 2. The optical arrangement in the reverse light-propagating direction (i.e., left to right) is shown by way of illustration in FIG. 3. Incoming light from outside an optical apparatus 10, i.e., reverse light, impinges on a third amplitude mask 120. That is, the incoming light hits all, or some portion, of the third amplitude mask. Only some of this incoming light, i.e., the on-axis, focused beams of the reverse light, passes through the first pinhole aperture. The third amplitude mask 120 is a standard amplitude mask. A standard first pinhole 130 in the third amplitude mask 120 limits the extent of the incoming light to on-axis, focused beams of the reverse light. The on-axis, focused beams of the reverse light are collimated by third lens 140. The third lens 140 is a standard lens. The third lens 140 is located at a distance $f_1$, e.g., one focal length, from the focus at a first amplitude mask 40. The first amplitude mask 40 is a standard amplitude mask. The first amplitude mask 40 includes a first limiting aperture 50 having first radius $R_1$. For example, the first limiting aperture 50 is a standard Lyot stop limiting aperture. For example, the distance between the first amplitude mask 40 and the third lens 140 is arbitrary or dependent on the user's application. First lens 60 is located a distance from the first limiting aperture 50. The first lens 60 is a standard lens. An optical vortex phase mask 70 is located at an intermediate focal plane of the vortex optical isolator 20. One of ordinary skill in the art will readily appreciate that the location of the intermediate focal plane is determined by the focal length of the lenses and the vortex phase mask. The vortex phase mask 70 is a standard vortex phase mask. For example, the vortex phase mask 70 is a standard scalar vortex phase mask or a standard vector vortex phase mask. One of ordinary skill in the art will readily appreciate that vector vortex phase masks are synonymously referred to in this field as vector vortex waveplates. Collimated reverse light from the third lens 140 passing through the first limiting aperture 50 is focused on the vortex phase mask 70 by first lens 60 at a distance $f_2$ from the vortex phase mask. For example, the distance $f_2$ is the one focal length mentioned above. At a distance $f_3$ from the intermediate focal plane is second lens 80 with a focal length of $f_3$. The second lens 80 is a standard lens. For example, the distance $f_3$ is the one focal length mentioned above. The second lens 80 collimates the reverse light transmitting through the vortex phase mask 70. A second amplitude mask 90 is located is located at distance after the first lens 80. For example, the second amplitude mask 90 is a standard amplitude mask. The second amplitude mask 90 includes a second limiting aperture 100 having second radius $R_2$. For example, the second limiting aperture 100 is a standard Lyot stop limiting aperture. For example, the distance between the second lens 80 and the second amplitude mask 90 is arbitrary or dependent on the user's application. The radius of the second limiting aperture 100 is less than the radius of the first limiting aperture 50, i.e., radius $R_1$>radius $R_2$. Because of this radius differential, the reverse light forms a "ring of fire" effect on the second amplitude mask 90, and this "ring of fire" of reverse light is blocked by the second amplitude mask 90 from passing through the second limiting aperture 100. The vortex optical isolator 20 includes fourth lens 150, which is a standard lens. The distance between the fourth lens 150 and the second amplitude mask 90 is arbitrary or dependent on the user's application. In the back focal plane of the vortex optical isolator 20 is a fourth amplitude mask 160. The fourth lens 150 with focal length $f_4$ is located a distance from the fourth amplitude mask 160. The fourth amplitude mask is a standard amplitude mask. The fourth amplitude mask 160 includes a second pinhole 170. For example, the distance $f_4$ is the one focal length mentioned above.

In a forward light-propagation, the second pinhole 170 limits the extent of the forward light from the light source 110 to on-axis, focused beams. The above-mentioned radius differential permits forward light from the light source 110 to pass through unimpeded through the first amplitude mask 40 and ultimately through the first pinhole 130 of the third amplitude mask 120. In this manner, an embodiment of the invention including the vortex optical isolator 20 does not impede the normal use of the light source 110.

In an embodiment of the invention, at least two of the first lens 60, the second lens 80, the third lens 140, and the fourth lens 150 have differing focal lengths. In an alternative embodiment of the invention, if $f_1=f_2=f_3=f_4$, the vortex optical isolator 20 is completely symmetric except for the differently sized first limiting aperture 50 and second limiting aperture 100. The radial asymmetry of the Lyot stop apertures allows for the optical isolator properties of this device by allowing light to get through the system in one direction, but completely blocking the light in the opposite direction. In this manner, an embodiment of the invention including the vortex optical isolator 20 blocks reverse light from impinging and potentially damaging the light source 110.

For example, the vortex phase mask 70 is described by $E=A_m(r)\exp(im\theta)$, where $A_m(r)$ is a circularly symmetric amplitude function and m is an integer mode number, also referred to as the "vortex charge." When the vortex phase mask 70 is located at the intermediate focal plane of the vortex optical isolator 20, the light is transformed in the pupil plane, which is the Fourier transform of the image plane such that all light is diffracted out of the aperture. For completeness, when the vortex phase mask 70 is located at the intermediate focal plane of the vortex optical isolator 20, the first amplitude mask 40 or the second amplitude mask 90 is located in the pupil plane depending on whether the light is forward light or reverse light. For example, when m=2, the optical field in the plane of the second limiting aperture 100 is:

$$E_{m=2}(r, \theta) = -e^{i2\theta}\begin{cases} 0, & r < R_1 \\ (R_1/r)^2, & r > R_1 \end{cases}$$

In an embodiment of the invention, reverse light in the entire central region up until radius $R_1$ is zero-valued by the combination of first lens 60, the vortex phase mask 70, and the second lens 80; this reverse light is "pushed out" to create a "ring of fire" beyond $R_1$. When radius $R_1$ is greater than radius $R_2$, the reverse-propagating "ring of fire" is blocked by the second limiting aperture 100, and no reverse light passes through rest of the vortex optical isolator 20, which might otherwise risk impinging the light source 110. With forward-propagating light, the conditions are reversed, such that the "ring of fire" now has a cut-off radius of the second amplitude mask's radius $R_2$. Hence, forward light from this forward-propagating "ring of fire" is not blocked by the first limiting aperture 50. This embodiment of the invention is effectively a one-way optical diode, allowing the "ring of fire" of forward light to pass through in one direction while blocking the "ring of fire" of reverse light completely in the reverse direction.

Although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

What is claimed as new and desired to be protected by Letters Patent of the United States is:

1. An apparatus comprising:
   an vortex optical isolator comprising an axis, said vortex optical isolator comprising:
   a first amplitude mask defining a first limiting aperture and aligned with said axis, said first limiting aperture comprising a first radius;
   a first lens in optical communication with said first limiting aperture and aligned with said axis;
   a vortex phase mask in optical communication with said first lens and aligned with said axis;
   a second lens in optical communication with said vortex mask and aligned with said axis; and
   a second amplitude mask defining a second limiting aperture in optical communication with said second lens and aligned with said axis, said second limiting aperture comprising a second radius smaller than said first radius; and
   a light source configured to transmit forward light through said vortex optical isolator, said light source being oriented on said axis such that said second amplitude mask blocks reverse light, transmitted in a direction opposite to that of the forward light, from impinging said light source.

2. The apparatus according to claim 1, wherein said vortex optical isolator further comprises:
   a third amplitude mask aligned with said axis and comprising a first pinhole aperture; and
   a third lens in optical communication with said first pinhole light source and aligned with said axis.

3. The apparatus according to claim 2, wherein said vortex optical isolator further comprises:
   a fourth lens in optical communication with said second limiting aperture and aligned with said axis; and
   a fourth amplitude mask in optical communication with said fourth lens and said light source, said fourth amplitude mask comprising a second pinhole aperture in optical communication with said light source and aligned with said axis.

4. The apparatus according to claim 3, wherein said fourth lens collimates the forward light, said second lens focusing the forward light onto said vortex phase mask, said first lens collimating the forward light, and said third lens focusing the forward light to said first pinhole aperture.

5. The apparatus according to claim 3, wherein said third lens collimates the reverse light, said first lens focusing the reverse light onto said vortex phase mask, said second lens collimating the reverse light.

6. The apparatus according to claim 3, wherein said third lens is located at a focal length from said first amplitude mask, said first lens being located at the focal length from said vortex phase mask, said vortex phase mask being located at the focal length from said second lens, said fourth lens being located at the focal length from said fourth amplitude mask.

7. The apparatus according to claim 1, wherein said light source comprises one of a laser, a light emitting diode, and a light bulb.

8. A method comprising:
   providing an vortex optical isolator in optical communication with a light source;
   transmitting a forward light from the light source through the vortex optical isolator;
   receiving reverse light in a direction opposite to that of the forward light at the vortex optical isolator; and
   blocking, using the vortex optical isolator, the reverse light from impinging the light source.

9. The method according to claim 8, wherein the vortex optical isolator comprises an axis, said vortex optical isolator further comprising:
   a first amplitude mask defining a first limiting aperture and aligned with said axis, said first limiting aperture comprising a first radius;
   a first lens in optical communication with said first limiting aperture and aligned with said axis;
   a vortex phase mask in optical communication with said first lens and aligned with said axis;
   a second lens in optical communication with said vortex mask and aligned with said axis; and
   a second amplitude mask defining a second limiting aperture in optical communication with said second lens and aligned with said axis, said second limiting aperture comprising a second radius sufficiently smaller than said first radius;
   a third amplitude mask aligned with said axis and comprising a first pinhole aperture; and
   a third lens in optical communication with said first pinhole light source and aligned with said axis.

10. The method according to claim 9, wherein said blocking, using the vortex optical isolator, the reverse light from impinging the light source comprises:
    collimating the reverse light using the third lens;
    focusing the reverse light onto the vortex phase mask using the first lens;
    collimating the reverse light using the second lens; and
    blocking the reverse light using the second amplitude mask.

11. The method according to claim 10, wherein said transmitting a forward light from the light source through the vortex optical isolator comprises:
    focusing the forward light onto the vortex phase mask using the second lens;
    collimating the forward light using the first lens; and
    focusing the forward light onto the first pinhole aperture using the third lens.

12. The method according to claim 10, wherein the vortex optical isolator further comprises:

fourth lens in optical communication with the second limiting aperture and aligned with the axis; and a fourth mask in optical communication with the fourth lens, the fourth mask comprising a second pinhole aperture in optical communication with the light source and aligned with the axis.

13. The method according to claim 12, wherein said transmitting a forward light from the light source through the vortex optical isolator comprises:

collimating the forward light using the fourth lens.

14. The method according to claim 12, wherein said third lens is located at a focal length from said first amplitude mask, said second lens being located at the focal length from said vortex phase mask, said vortex mask being located at the focal length from said second lens, said fourth lens is located at the focal length from said fourth amplitude mask.

15. The method according to claim 8, wherein said light source comprises one of a laser, a light emitting diode, and a light bulb.

\* \* \* \* \*